Patented Nov. 24, 1931

1,833,506

UNITED STATES PATENT OFFICE

THEODORE B. WAGNER, OF BROOKLYN, NEW YORK

ORGANIC CALCIUM PHOSPHATE AND IMPROVED METHOD OF MAKING SAME

No Drawing. Application filed May 19, 1928. Serial No. 279,196.

In my United States Letters Patent No. 1,716,286, of June 4, 1929, I have described a process for producing from the steepwater of corn a compound the major portion of which consists of an insoluble lime salt of organic phosphoric acid. This material is of value as an article of food or medicine as the human body can take from it certain calcium and phosphorous elements needed in its economy. The essential feature of such process lies in the complete neutralization of the steepwater by means of milk of lime. The process calls for continuous testing during the progress of neutralization and precipitation and for extremely careful preparation of the milk of lime lest uncombined calcium hydroxide remain commingled with the final product.

I have discovered that I can overcome these disadvantages by my new and improved method which readily yields the saturated calcium salt of the organic phosphoric acid contained in the steepwater of corn and it forms the subject matter of my present invention.

I accomplish the desired result by employing as my precipitating agent a soluble salt of calcium, for instance, calcium acetate. Free acetic acid as may be set free by such precipitating agent, exerts no appreciable solvent action on my saturated organic calcium phosphate and is therefore not adverse to my purpose.

In carrying out my invention I may proceed by employing steepwater which has been previously heated and to which diatomaceous earth or other suitable material has been added to facilitate filtration and to the steepwater thus filtered, while hot, I add a clear solution of calcium acetate until no further precipitation occurs. The precipitate is filter-pressed, washed and dried. Without departing from the spirit of the invention, my method may be varied, of course, by the substitution of other soluble salts of calcium or by the neutralization of any objectionable acid accompanying the precipitation of the saturated calcium salt, or by neutralizing successively with milk of lime and a soluble calcium salt.

In practice I may carry out my invention in the following manner:

To obtain about 1000 pounds of my improved organic calcium phosphate, I take about 2200 gallons of "heavy" steepwater, usually having a specific gravity corresponding to 24° Beaumé, reduce it, by the addition of water, to 18° Beaumé, or less, heat it to about 180° F., add diatomaceous earth to the extent of about ½ of 1% of the weight of the heavy steepwater and filter while hot. I now add to the filtrate about 1500 pounds of acetate of lime dissolved in 3000 pounds of water and separate the resulting precipitate from the liquor by filter-pressing or other suitable means, wash it thoroughly and then dry it at a fairly high temperature until the remaining amount of water is reduced to practically 10%. After drying, my improved organic calcium phosphate constitutes a white powder, the calcium content of which is approximately 25%, calculated as Ca.

I claim:

1. The method of producing a compound the major portion of which consists of an insoluble lime salt of organic phosphoric acid and which is derived from the steepwater of corn which consists in adding to the steepwater a solution of a calcium salt, the acid component of which exerts no appreciable solvent action upon the saturated calcium salt, and collecting the resultant precipitate, substantially as described.

2. The method of producing a compound the major portion of which consists of an insoluble lime salt of organic phosphoric acid and which is derived from the steepwater of corn which consists in adding to the steepwater a solution of a calcium salt, neutralizing the free acid generated during precipitation, and collecting the resultant precipitate, substantially as described.

3. The method of producing a compound the major portion of which consists of an insoluble lime salt of organic phosphoric acid and which is derived from the steepwater of corn which consists in adding to the steepwater a solution of calcium acetate, and collecting the resultant precipitate, substantially as described.

THEODORE B. WAGNER.